(12) United States Patent
Brown et al.

(10) Patent No.: US 9,061,881 B2
(45) Date of Patent: Jun. 23, 2015

(54) SYSTEM AND METHOD FOR HARVESTING ENERGY SAVINGS ON A REMOTE BEVERAGE SYSTEM

(75) Inventors: James Wallace Brown, Crestwood, KY (US); Aaron Charles Sprinkle, Charlestown, IN (US); James R. Morrow, Sr., Sellersburg, IN (US)

(73) Assignee: Manitowoc Foodservice Companies, LLC, Manitowoc, WI (US)

( * ) Notice: Subject to any disclaimer, the term of this patent is extended or adjusted under 35 U.S.C. 154(b) by 711 days.

(21) Appl. No.: 13/241,793

(22) Filed: Sep. 23, 2011

(65) Prior Publication Data

US 2012/0078414 A1 Mar. 29, 2012

Related U.S. Application Data

(60) Provisional application No. 61/386,340, filed on Sep. 24, 2010.

(51) Int. Cl.

| | |
|---|---|
| *G04F 10/00* | (2006.01) |
| *B67D 1/08* | (2006.01) |
| *B67D 1/12* | (2006.01) |
| *B67D 1/00* | (2006.01) |
| *G06F 11/34* | (2006.01) |

(52) U.S. Cl.
CPC ............ *B67D 1/0888* (2013.01); *B67D 1/0084* (2013.01); *G06F 11/34* (2013.01); *B67D 1/0054* (2013.01); *B67D 1/0057* (2013.01); *B67D 1/0066* (2013.01); *B67D 1/0021* (2013.01); *B67D 1/0022* (2013.01); *B67D 1/006* (2013.01); *B67D 1/0064* (2013.01); *B67D 1/1202* (2013.01); *B67D 2210/00099* (2013.01)

(58) Field of Classification Search
CPC .. B67D 1/0057; B67D 1/0884; B67D 1/0054; G06F 11/34
USPC .............................................. 222/32; 702/177
See application file for complete search history.

(56) References Cited

U.S. PATENT DOCUMENTS

| | | | |
|---|---|---|---|
| 2,502,610 A * | 4/1950 | Wegman | .......................... 62/339 |
| 3,021,685 A | 2/1962 | Gore et al. | |
| 4,463,278 A | 7/1984 | Kosmatka et al. | |
| 4,759,474 A * | 7/1988 | Regunathan et al. | .... 222/189.06 |
| 4,969,576 A | 11/1990 | Merrill et al. | |
| 5,033,645 A | 7/1991 | Shannon et al. | |
| 5,443,763 A * | 8/1995 | Notar et al. | ................. 261/140.1 |
| 5,839,291 A | 11/1998 | Chang | |
| 5,918,468 A | 7/1999 | Cassells et al. | |
| 6,036,053 A * | 3/2000 | Simmons et al. | .................. 222/1 |
| 6,260,477 B1 * | 7/2001 | Tuyls et al. | .................. 99/323.2 |
| 6,421,583 B1 | 7/2002 | Sudolcan et al. | |
| 6,496,752 B2 | 12/2002 | Sudolcan et al. | |

(Continued)

OTHER PUBLICATIONS

International Preliminary Report of Patentability dated Jul. 19, 2013 corresponding to PCT/US11/52900, 4 pp.

(Continued)

*Primary Examiner* — Sujoy Kundu
*Assistant Examiner* — Paul D Lee
(74) *Attorney, Agent, or Firm* — Ohlandt, Greeley, Ruggiero & Perle, LLP

(57) ABSTRACT

A method and system that detects if a carbonator has cycled in a beverage system and deactivates a circulator pump that circulates carbonated water in the beverage system based on if the carbonator has cycled.

24 Claims, 3 Drawing Sheets

(56) References Cited

U.S. PATENT DOCUMENTS

| | | |
|---|---|---|
| 6,505,758 B2 | 1/2003 | Black et al. |
| 6,600,968 B2 | 7/2003 | Sudolcan et al. |
| 6,644,508 B2 | 11/2003 | Haskayne et al. |
| 6,745,581 B2 | 6/2004 | King et al. |
| 6,751,525 B1 | 6/2004 | Crisp, III |
| 6,934,602 B2 | 8/2005 | Sudolcan et al. |
| 7,162,391 B2 | 1/2007 | Knepler et al. |
| 7,268,698 B2 | 9/2007 | Hart et al. |
| 7,564,370 B2 | 7/2009 | Hart et al. |
| 7,918,156 B2 | 4/2011 | Greenwald et al. |
| 2004/0050075 A1 | 3/2004 | King et al. |

OTHER PUBLICATIONS

International Search Report dated Feb. 23, 2012 in counterpart International Application No. PCT/US11/52900.

Australian Office Action dated May 22, 2014 for Australian patent application No. 2011305245.

Chinese Office Action dated Jun. 4, 2014 for Chinese patent application No. 201180051346.9.

Russian Office Action dated Nov. 13, 1990 for Russian application No. 2013118690; pp. 1-7.

\* cited by examiner

SYSTEM AND METHOD FOR HARVESTING ENERGY SAVINGS ON A REMOTE BEVERAGE SYSTEM

CROSS-REFERENCED APPLICATION

The present application claims priority to U.S. Provisional Application Ser. No. 61/386,340, filed on Sep. 24, 2010, which is incorporated herein in its entirety by reference thereto.

BACKGROUND

1. Field of the Invention

The present disclosure relates to remote beverage systems. Particularly, the present disclosure relates to a system and method for harvesting energy savings on a remote beverage system.

2. Description of the Related Art

Conventional remote beverage systems include a circulator pump and an agitator. The circulator pump continuously circulates carbonated water in a closed path between a carbonator tank and a beverage dispenser with some of the carbonated water periodically being dispensed from the closed path of the beverage system to a user. The agitator agitates or moves water in a water bath to cool such beverage system components as the carbonator tank that combines carbon dioxide and water to form carbonated water as well as various heat exchangers and refrigeration system components of the remote beverage system. Typically, the circulator pump continuously circulates the carbonated water and the agitator continuously agitates water in the water bath. Thus, both the agitator and circulator pump consume energy, e.g., from a source of electricity.

The problem with such remote beverage systems is continuous circulation of the carbonated water and continuous agitation of the water in the water bath requires continuous energy consumption by the circulator pump and the agitator.

The present disclosure overcomes the deficiencies of such remote beverage systems and allows for turning the circulation pump off and on. The present disclosure further overcomes the deficiencies of such remote beverage systems by allowing for turning the agitator motor off and on.

SUMMARY

There is provided a method and system that detects if a carbonator has cycled in a beverage system and deactivates a circulator pump that circulates carbonated water in the beverage system, and a water bath agitator which keeps cooling medium moving and mixed providing heat exchange, based on if the carbonator has cycled.

An energy saving method for use in a beverage system, the method comprising detecting if a carbonator has cycled in the beverage system; and if the carbonator has cycled, deactivating a circulator pump that circulates carbonated water in the beverage system.

The method further comprising detecting an end of a carbonator cycle; setting a carbonator elapsed time to zero; and incrementing the carbonator elapsed time.

The method further comprising determining if the carbonator elapsed time is greater than a carbonator elapsed time set point.

The method further comprising determining if a temperature of the carbonated water circulated by the circulator pump is below a carbonated water set point.

The method further comprising providing a water bath having a cooling medium that is in thermal communication with the carbonator; and determining if a bath temperature of the cooling medium is below a bath set point.

The method further comprising determining the presence of an error code.

The method further comprising setting an energy saving elapsed time to zero prior to deactivating the circulator pump.

The method further comprising detecting if a second circulator pump is present. The method further comprising detecting if the second circulator pump is deactivated.

The method further comprising deactivating an agitator in the bath. The method further comprising detecting if a carbonator has cycled after deactivating an agitator in the bath; incrementing the energy saving elapsed time; and detecting if the energy saving elapsed time is greater than a energy saving elapsed time set point. The method further comprising activating the agitator and the circulator pump if the energy saving elapsed time is greater than an energy saving elapsed time set point.

An energy saving system comprising a processor; and a memory having instructions stored therein in a form that is readable by the processor, wherein the instructions, when read by the processor, cause the processor to perform the steps of: detecting if a carbonator has cycled in a beverage system; and if the carbonator has cycled, deactivating a circulator pump that circulates carbonated water in the beverage system.

The above-described and other features and advantages of the present disclosure will be appreciated and understood by those skilled in the art from the following detailed description, drawings, and appended claims.

DESCRIPTION OF THE PREFERRED EMBODIMENT

Figure 1:
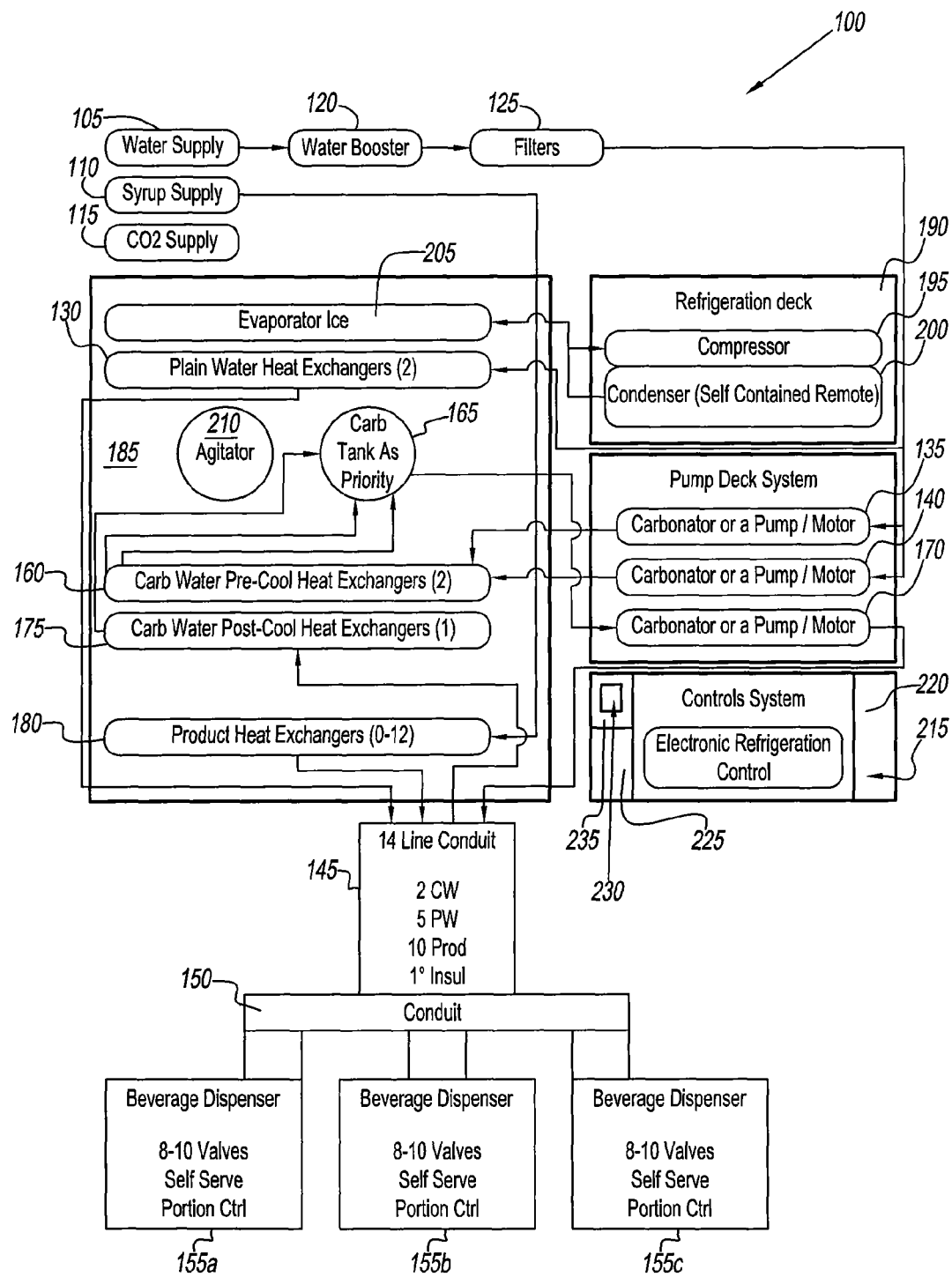
FIG 1 is an illustrative diagram of a first embodiment of a beverage dispenser system.

FIG 1 is an illustrative diagram of a first embodiment of a beverage dispenser system 100 ("system 100"). System 100 is connected to a water supply 105, a syrup supply 110 and a carbon dioxide supply 115. Water supply 105 may be any water source, for example, a public water supply. Syrup supply 110 may supply any flavoring that is used to form a beverage. Carbon dioxide supply 115 may be any source of carbon dioxide.

System 100 has a booster 120 that is connected to water supply 105. The water from water supply 105 passes through filters 125 of system 100 that is connected to booster 120. Booster 120 increases water pressure, which feeds both a plain water heat exchanger and a carbonator. Filters 125 remove contaminants and particulates in the supply water.

The water flows from filters 125 to a plain water heat exchanger 130 and carbonator pumps 135 and 140. Plain water heat exchanger 130 cools or reduces a temperature of the water supplied thereto. Plain water refers herein to water that is not carbonated by a carbonator tank. The water flows from plain water heat exchanger 130 to a line conduit 145. The plain water flows from line conduit 145 to beverage dispensers 155a, 155b, and 155c via conduit 150. Beverage dispensers 155a, 155b, and 155c mix syrup and plain water to form a beverage and dispense the beverage to a user. Alternatively, beverage dispensers 155a, 155b, and 155c can dispense the plain water without syrup.

Carbonator pumps 135 and 140 each have a motor connected to a power source that operates a pump. Carbonator pumps 135 and 140 are each connected to one or more carbonated water pre-cool heat exchanger 160. Carbonator pumps 135 and 140 generate a flow of the water from water supply 105 to carbonated water pre-cool heat exchanger 160. Carbonated water pre-cool heat exchanger 160 cools or reduces a temperature of the water supplied thereto.

The water flows from carbonated water pre-cool heat exchanger 160 to a carbonator tank 165. Carbonator tank 165 combines carbon dioxide and water to form carbonated water.

The carbonated water flows from carbonator tank 165 to a circulator pump 170. Circulator pump 170 has a motor connected to a power source that operates a pump. Circulator pump 170 may be, for example, a magnetic drive pump that rotates an impeller via magnets and has no mechanical connection between the motor and the impeller. Circulator pump 170 generates a flow of the carbonated water from circulator pump 170 to line conduit 145. Line conduit 145 is connected to a carbonator water post-cool heat exchanger 175 and beverage dispensers 155a, 155b, and 155c by conduit 150. The carbonated water flows from line conduit 145 to beverage dispensers 155a, 155b, and 155c via conduit 150. Beverage dispensers 155a, 155b, and 155c mix syrup and the carbonated water to form a beverage and dispense the beverage to a user. Alternatively, beverage dispensers 155a, 155b, and 155c can dispense the carbonated water without syrup.

Circulator pump 170 circulates the carbonated water to carbonator water post-cool heat exchanger 175 from line conduit 145. Carbonator water post-cool heat exchanger 175 cools or reduces a temperature of the carbonated water that is then circulated back into carbonator tank 165. Circulator pump 170 circulates the carbonated water from carbonator tank 165 to circulator pump 170, to line conduit 145, to carbonator water post-cool heat exchanger 175 and back to carbonator tank 165 until the carbonated water is dispensed by one of beverage dispensers 155a, 155b, and 155c.

Syrup supply 110 is connected to product heat exchanger 180. Product heat exchanger 180 cools or reduces a temperature of the syrup from syrup supply 110. Product heat exchanger 180 is connected to a line conduit 145 and supplies syrup thereto. Line conduit 145 is connected to beverage dispensers 155a, 155b, and 155c via conduit 150.

Beverage dispensers 155a, 155b, and 155c mix the syrup and carbonated water or plain water to form a beverage and dispense the beverage to a user. Beverage dispensers 155a, 155b, and 155c can each be at a different location. For example, a first beverage dispenser is located near a drive through window of a restaurant for a restaurant employee to serve customers through a drive through window and two beverage dispensers are located in a self-serve area of the restaurant for customers to use.

Carbon dioxide supply 115 is connected to carbonator tank 165. Carbon dioxide supply 115 supplies carbon dioxide to carbonator tank 165 that combines carbon dioxide and water to form the carbonated water.

Plain water heat exchanger 130, carbonated water pre-cool heat exchanger 160, carbonator tank 165, carbonator water post-cool heat exchanger 175, and product heat exchanger 180 are all positioned within a water bath 185. Water bath 185 is a container filled with cooling medium, for example, water and/or ice, to cool or reduce the temperature of the carbonated water in carbonator tank 165, the plain water in plain water heat exchanger 130, the carbonated water in carbonated water pre-cool heat exchanger 160, the carbonated water in carbonator water post-cool heat exchanger 175, and the syrup in product heat exchanger 180. The cooling medium in water bath 185 is in thermal communication with a refrigeration system 190. Refrigeration system 190 has a compressor 195, a condenser 200 and evaporator 205 to perform a vapor compression cycle. Condenser 200 may be remote from compressor 190 and evaporator 205 or in the same location therewith. Evaporator 205 is in thermal communication with the cooling medium to cool or reduce the temperature thereof.

Water bath 185 has an agitator 210. Agitator 210 has a motor connected to a power source that operates an agitator. Agitator 210 generates a flow or moves the cooling medium in water bath 185 to move the cooling medium into and out of contact with evaporator 205 to cool the cooling medium and into and out of contact with plain water heat exchanger 130, carbonated water pre-cool heat exchanger 160, carbonator tank 165, carbonator water post-cool heat exchanger 175, and product heat exchanger 180 to cool or reduce the temperature of each component and liquid therein.

System 100 has a control system 215. Control system 215 provides a central processor 220 that is in communication with at least circulator pump 170 and/or agitator 210. Control system 215 may operate all of the components of system 100. Control system 215 further provides a memory 225 that is in communication with processor 220. Machine-readable instructions 230 are resident in memory 225 for execution by processor 220. Instructions 230 persistently stored on a storage medium 235 for loading into memory 225 to cause processor 220 to carry out the steps of a method described herein. Storage medium 235 in turn may be physically distant to processor 220, local to processor 220, or some combination of local and distant.

Figure 2:
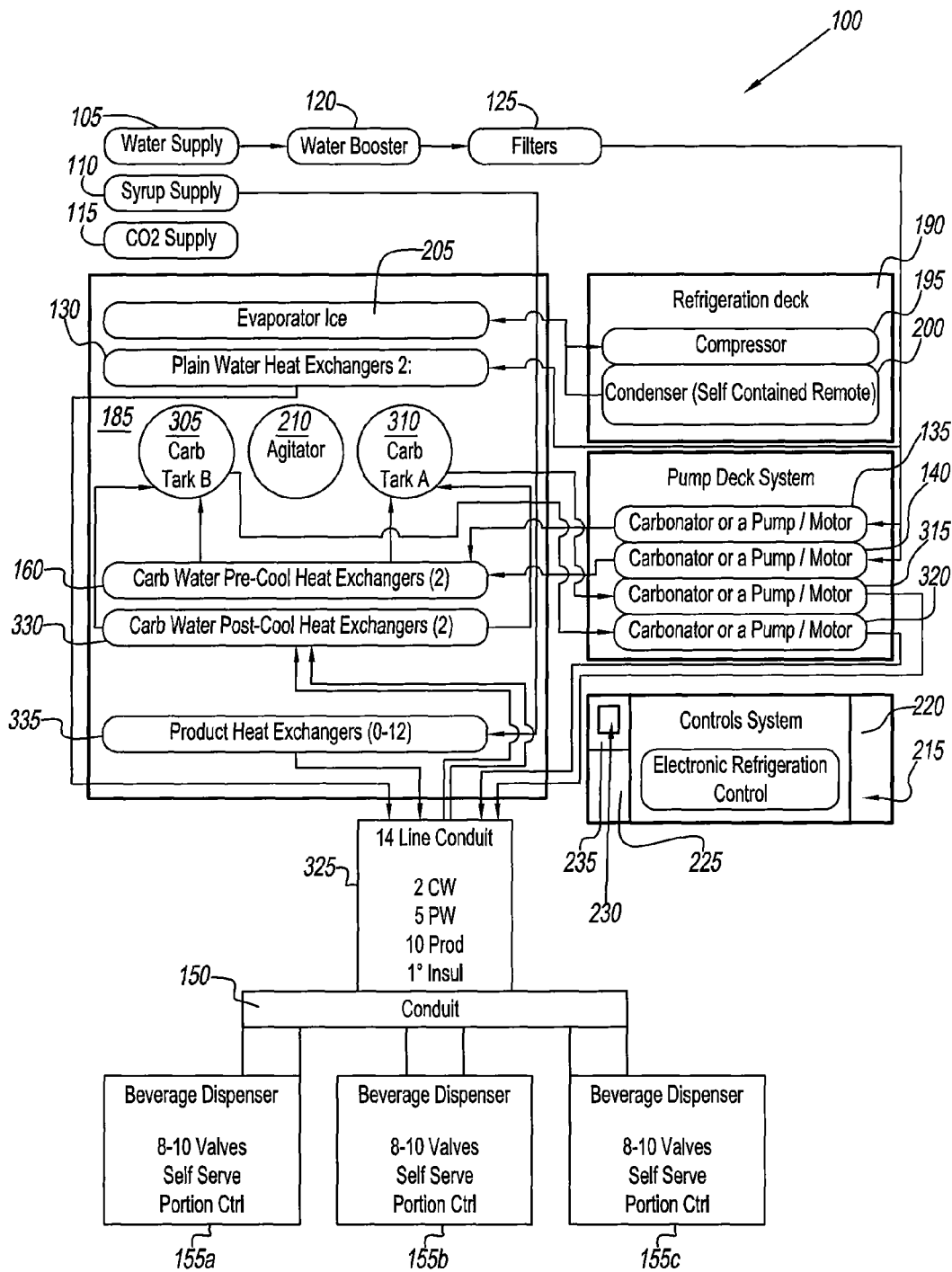
FIG 2 is an illustrative diagram of a second embodiment of a beverage dispenser system.

FIG 2 is an illustrative diagram of a second embodiment of a beverage dispenser system 300 ("system 300"). System 300 is similar to system 100 with components of system 100 that are the same in system 300 having the same reference numerals. System 300 differs from system 100 by including two carbonator tanks 305 and 310 that each receive the water from carbonated water pre-cool heat exchanger 160 and each combine carbon dioxide and the water to form the carbonated water.

System 300 further differs from system 100 by including two circulator pumps 315 and 320. Each of circulator pumps 315 and 320 has a motor connected to a power source that operates a pump. Circulator pumps 315 and/or 320 may be, for example, a magnetic drive pump that rotates an impeller via magnets and has no mechanical connection between the motor and the impeller. Circulator pump 315 receives carbonated water from carbonator tank 310 and generates a flow of the carbonated water from circulator pump 315 to a line conduit 325. Circulator pump 320 receives carbonated water from carbonator tank 305 and generates a flow of the carbonated water from circulator pump 320 to a line conduit 325. Line conduit 325 is similar to line conduit 145, however, line conduit 325 is a sixteen line conduit and line conduit 145 is a fourteen line conduit.

Line conduit 325 is connected to a carbonator water post-cool heat exchanger 330 and beverage dispensers 155a, 155b, and 155c by conduit 150. Carbonator water post-cool heat exchanger 330 cools or reduces the temperature of the carbonated water. The carbonated water from carbonator water post-cool heat exchanger 330 flows into both carbonator tanks 305 and 310. Carbonator water post-cool heat exchanger 330 is similar to carbonator water post-cool heat exchanger 175, however, may have a different tube length and/or number of bends. In addition, the carbonated water flows from line conduit 325 to beverage dispensers 155*a*, 155*b*, and 155*c* via conduit 150.

System 300 has two independent carbonator and circulation systems. A first carbonator and circulation system includes circulator pump 315 that circulates the carbonated water from carbonator tank 310 to circulator pump 315, to line conduit 325, to carbonator water post-cool heat exchanger 330 and back to carbonator tank 310 until the carbonated water is dispensed by one of beverage dispensers 155*a*, 155*b*, and 155*c*. A second carbonator and circulation system includes circulator pump 320 that circulates the carbonated water from carbonator tank 305 to circulator pump 320, to line conduit 325, to carbonator water post-cool heat exchanger 330 and back to carbonator tank 305 until the carbonated water is dispensed by one of beverage dispensers 155*a*, 155*b*, 155*c*. The first and second carbonator and circulation systems may have their own pre-cool heat exchanger and post-cool heat exchanger. In addition, carbonator tank 305 may circulate the carbonated water to any number or all of beverage dispensers 155*a*, 155*b*, and 155*c*, while carbonator tank 310 may also circulate the carbonated water to any number or all beverage dispenser(s) of beverage dispensers 155*a*, 155*b*, and 155*c*.

Syrup supply 110 is connected to a product heat exchanger 335. Product heat exchanger 335 cools or reduces a temperature of the syrup from syrup supply 110. Product heat exchanger 335 is similar to product heat exchanger 180, however, may have a different tube length and/or number of bends. Product heat exchanger 335 is connected to a line conduit 325 and supplies syrup thereto. Line conduit 325 is connected to beverage dispensers 155*a*, 155*b*, and 155*c* via conduit 150.

Figure 3:
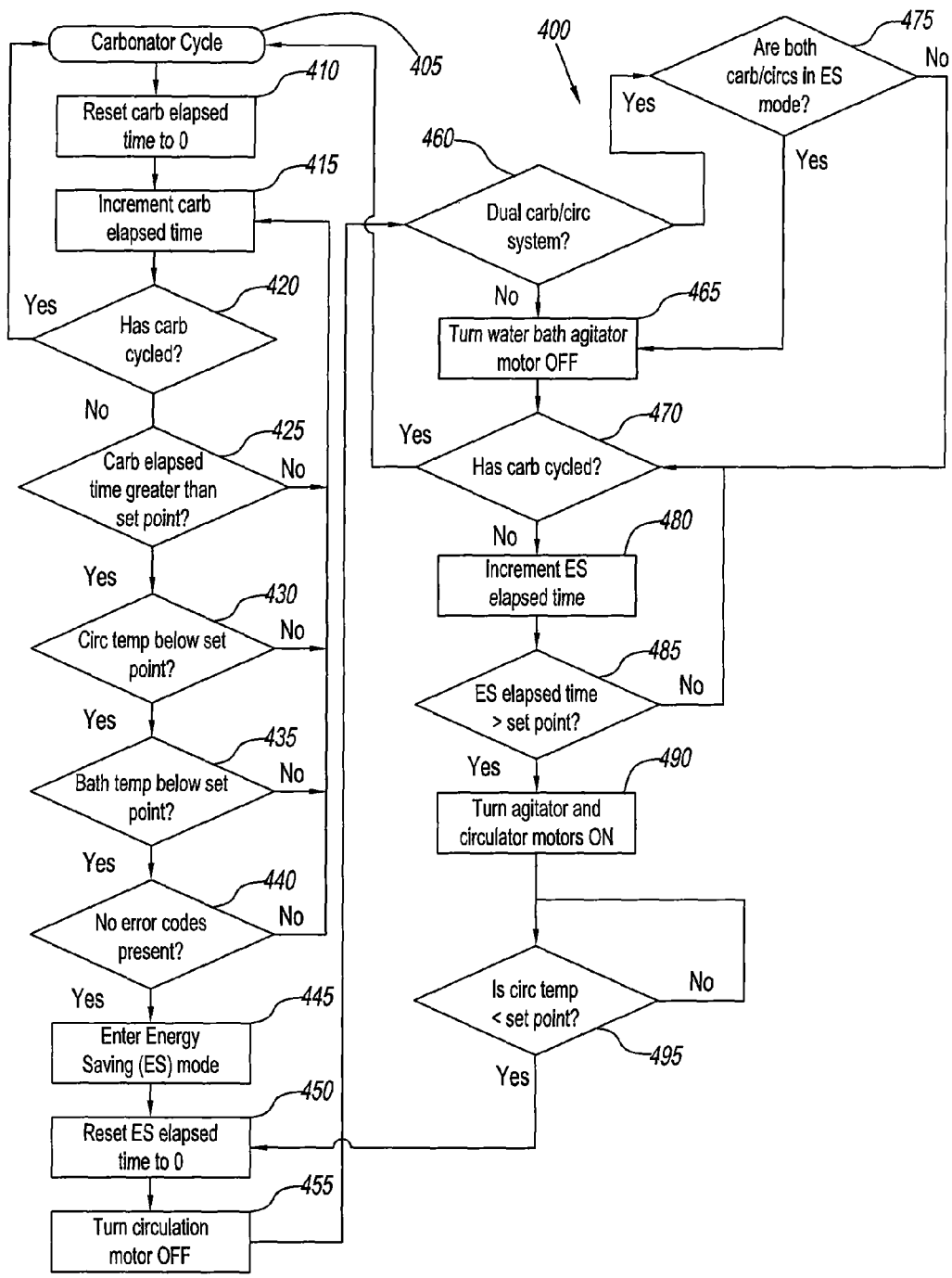
FIG 3 is a method of harvesting energy savings on a remote beverage system.

A method of harvesting energy savings on a remote beverage system 400 ("method 400") such as systems 100 and 300 is shown in FIG 3. Method 400 begins at step 405, when a carbonator cycle ends. A carbonator tank, for example, carbonator tanks 165, 305 and 310, contains a liquid level sensor which, when carbonated water drops to a predetermined minimum level, a signal is sent to an input on the controller, for example, control system 215, beginning the carbonator cycle, which fires a relay energizing the motor of the carbonator pump, for example, carbonator pump 135 or 140, and a carbon dioxide valve, which results in production of more carbonated water, filling the carbonator tank until a predetermined maximum limit is realized, at which time a signal is sent back to the controller to close the relay, thus de-energizing the motor of the carbonator pump and carbon dioxide valve ending the carbonator cycle. The controller keeps count of the carbonator cycles.

Method 400 next progresses to step 410 where a carbonator cycle elapsed time is set to zero. In step 410, a carbonator cycle elapsed time clock is reset to zero following each carbonator cycle. Method 400 next progresses to step 415 when the carbonator elapsed time is incremented. The carbonator elapsed time can be incremented by a timer.

Method 400 progresses from step 415 to step 420 that determines whether a carbonator cycle has occurred. If a carbonator cycle has occurred, then method 400 returns to step 405. If a carbonator cycle has not occurred, method 400 proceeds to step 425.

Step 425 determines whether the carbonator elapsed time is greater than a carbonator elapsed time set point. If the carbonator elapsed time is not greater than the carbonator elapsed time set point, then method 400 returns to step 415. If the carbonator elapsed time is greater than the carbonator elapsed time set point, then method 400 proceeds to step 430. The carbonator elapsed time set point is a number of elapsed minutes based on testing to optimize. The elapsed time set point may be a constant figure or may be field adjustable within a determined range.

Step 430 determines whether a circulation temperature is below a circulation temperature set point. The circulation temperature is a temperature of the carbonated water after it returns to the post-cool heat exchanger, for example, post-cool heat exchanger 175 or 330. If the circulation temperature is not below the circulation temperature set point, then method 400 returns to step 415. If the circulation temperature is below the circulation temperature set point, then method 400 proceeds to step 435. The circulation temperature is sensed via an in-line thermistor in the circulation loop in which the carbonated water circulates. The circulation temperature is fed back to an input on the controller, for example, control system 215. In system 300, a first input may be for the first carbonator and circulation system and a second input may be for the second carbonator and circulation system.

Step 435 determines whether a water bath temperature, for example, a temperature of the cooling medium of water bath 185, is below a water bath temperature set point. If the water bath temperature is not below the water bath temperature set point, then method 400 returns to step 415. If the water bath temperature is below the water bath temperature set point, then method 400 proceeds to step 440. A temperature thermistor may be positioned in the water bath, for example, water bath 185, to sense the cooling medium temperature. The water bath temperature is used for error codes. If the water bath temperature exceeds a set point, it is an indication of an agitator or circulation motor failure. Method 400 may include that if any error code arises, the system is immediately ejected from energy save mode and returned to normal operation.

Step 440 determines whether any error codes are present. If error codes are present, then method 400 returns to step 415. If error codes are not present, then method 400 proceeds to step 445. Error codes are established and displayed via 4 segment display to alert the store that one of the components of the system, for example, system 100 and 300, critical to providing product cooling has failed. Various temperatures and pressures are monitored for normal operation in the system. Should the operation of said system parameters fall outside allowable limits, there is logic within the controller, for example, control system 215, that determines the right error code to display.

In step 445, the beverage system, for example, system 100 and 300, enters energy saving mode and method 400 proceeds to step 450.

In step 450, an energy saving elapsed time is set to zero, and method 400 proceeds to step 455.

In step 455, a motor, for example, of circulator pump 170 or circulator pumps 315 and 320, is turned off, and method 400 proceeds to step 460.

In step 460, method 400 determines whether the beverage system, for example, system 100 and 300, is a dual circulation system. A dual circulation system has more than one circulator pump, for example, system 300 has circulator pumps 315 and 320. Whereas, system 100 is a single circulation system having circulator pump 170. If the beverage system is not a dual circulation system, then the method proceeds to step 465. If the beverage system is a dual circulation system, then the method proceeds to step 475.

In step 465, method 400 turns an agitator motor off and proceeds to step 470. For example, control system 215 turns the motor of agitator 210 off.

In step 475, method 400 determines whether both circulator motors are in energy saving mode. For example, control system 215 determines whether both motors of both circulator pumps 315 and 320 are turned off or deactivated. If both circulator motors are in energy saving mode, then method 400 proceeds to step 465. If both circulator motors are not in energy saving mode, then method 400 proceeds to step 470.

In step 470, method 400 determines whether a carbonation cycle has occurred. If a carbonation cycle has occurred, then method 400 proceeds to step 405. If a carbonation cycle has not occurred, then method 400 proceeds to step 480.

In step 480, the energy savings elapsed time is incremented and the method proceeds to step 485. The energy savings elapsed time can be incremented, for example, by a timer included in control system 215.

In step 485, method 400 determines whether the energy savings elapsed time is greater than an energy saving mode elapsed time set point. If the energy savings elapsed time is not greater than the energy saving mode elapsed time set point, then method proceeds to step 470. If the energy savings elapsed time is greater than the energy saving mode elapsed time set point, then method proceeds to step 490.

In step 490, the motors of the agitator and the circulator pumps are turned on or activated and are no longer in energy saving mode, and method 400 proceeds to step 495. For example, control system 215 turns the motor of agitator 210 and the motors of circulator pumps 170 or 315 and 320 on.

In step 495, method 400 determines whether the circulation temperature is below a set point. If the circulation temperature is below a set point, then method 400 proceeds to step 450. If the circulation temperature is not below a set point, then method 400 repeats step 495.

In conventional beverage systems, for example, systems 100 and 300 without method 400, the motors of circulator pumps are on twenty-four hours a day, seven days a week as long as the beverage system is in operation. Method 400 turns off the motors of the agitator, for example, agitator 210, and circulator pumps, for example, circulator pumps 170, 315 and/or 320, during times in which the beverage system does not detect cycles from the carbonator. Method 400 monitors the frequency of carbonator motor/pump cycles to determine demand for drinks and therefore store activity. Method 400 identifies low demand periods and shuts down and/or cycles non-essential functions to save energy.

Method 400 and systems 100 and 300 that include method 400 have key parameters to ensure system performance is maintained to a minimum acceptable level. These parameters may be hard coded or user adjustable as necessary or desired.

Method 400 may be a software based system implemented by, for example, control system 215. Existing beverage systems similar to systems 100 and 300 may have control system 215 that can be programmed to include method 400 or the controller may be retrofitted with method 400 by a software upgrade including an elapsed timer using sensors that are already present in the system, for example, circulation temperature sensor(s), water bath temperature sensor, refrigerant liquid line temperature sensor, a suction line sensor, and/or a water pressure sensor. In method 400 the carbonator elapsed time set point, the circulation temperature set point, the water bath temperature set point and energy saving mode elapsed time set point can be user adjustable (variables) or hard coded (constants) as deemed appropriate for the application.

Method 400 may allow for an energy savings about 5 percent to about 10 percent over beverage systems, such as, systems 100 and 300, without method 400. Depending upon the ambient environment in which the conduit lives and the demand placed on the system in a store, the energy savings may be more or less than about 5 percent to about 10 percent over beverage systems, such as, systems 100 and 300, without method 400.

The agitator and circulator pumps may be controlled independently in method 400. Accordingly, method 400 may be modified to only control the circulator pump. Method 400 may also be modified to only control the agitator.

Method 400 can be used with other beverage systems similar to systems 100 and 300.

It should also be recognized that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An energy saving method for use in a beverage system, said method comprising:
   detecting if a carbonator cycle has occurred in said beverage system by a controller, wherein during said carbonator cycle, a motor of a carbonator pump and a carbon dioxide valve is energized and then said motor of said carbonator pump and said carbon dioxide valve is de-energized to end said carbonator cycle;
   if said carbonator cycle has not occurred, deactivating a circulator pump by said controller, said circulator pump generating a flow of said carbonated water from said circulator pump to a beverage dispenser; and
   if said carbonator cycle has occurred after said circulator pump is deactivated, activating said circulator pump by said controller.

2. The method of claim 1, further comprising:
   detecting said end of said carbonator cycle;
   setting a carbonator elapsed time to zero; and
   incrementing the carbonator elapsed time.

3. The method of claim 2, further comprising:
   determining if the carbonator elapsed time is greater than a carbonator elapsed time set point.

4. The method of claim 2, further comprising:
   determining if a temperature of the carbonated water circulated by the circulator pump is below a carbonated water set point.

5. The method of claim 2, further comprising:
   determining the presence of an error code.

6. The method of claim 2, further comprising:
   setting an energy saving elapsed time to zero prior to deactivating the circulator pump.

7. The method of claim 6, further comprising:
   deactivating an agitator in a water bath.

8. The method of claim 7, further comprising:
   detecting if said carbonation cycle has occurred after deactivating the agitator in the water bath;
   incrementing the energy saving elapsed time; and
   detecting if the energy saving elapsed time is greater than an energy saving elapsed time set point.

9. The method of claim 8, further comprising:
activating the agitator and the circulator pump if the energy saving elapsed time is greater than the energy saving elapsed time set point.

10. The method of claim 2, further comprising:
detecting if a second circulator pump is present.

11. The method of claim 10, further comprising:
detecting if the second circulator pump is deactivated.

12. The method of claim 1, further comprising:
providing a water bath having a cooling medium that is in thermal communication with said carbonated water; and
determining if a bath temperature of the cooling medium is below a bath set point.

13. An energy saving system comprising:
a processor; and
a memory having instructions stored therein in a form that is readable by said processor, wherein said instructions, when read by said processor, cause said processor to perform the steps of:
detecting if a carbonator cycle has occurred in a beverage system, wherein during said carbonator cycle, a motor of a carbonator pump and a carbon dioxide valve is energized and then said motor of said carbonator pump and said carbon dioxide valve is de-energized to end said carbonator cycle;
if said carbonator cycle has not occurred, deactivating a circulator pump, said circulator pump generating a flow of said carbonated water from said circulator pump to a beverage dispenser; and
if said carbonator cycle has occurred after said circulator pump is deactivated, activating said circulator pump.

14. The system of claim 13, further comprising:
detecting the end of said carbonator cycle;
setting a carbonator elapsed time to zero; and
incrementing the carbonator elapsed time.

15. The system of claim 14, further comprising:
determining if the carbonator elapsed time is greater than a carbonator elapsed time set point.

16. The system of claim 14, further comprising:
determining if a temperature of the carbonated water circulated by the circulator pump is below a carbonated water set point.

17. The system of claim 14, further comprising:
determining the presence of an error code.

18. The system of claim 14, further comprising:
setting an energy saving elapsed time to zero prior to deactivating the circulator pump.

19. The system of claim 18, further comprising:
deactivating an agitator in a water bath.

20. The system of claim 19, further comprising:
detecting if said carbonator cycle has occurred after deactivating the agitator in the water bath;
incrementing the energy saving elapsed time; and
detecting if the energy saving elapsed time is greater than an energy saving elapsed time set point.

21. The system of claim 20, further comprising:
activating the agitator and the circulator pump if the energy saving elapsed time is greater than the energy saving elapsed time set point.

22. The system of claim 14, further comprising:
detecting if a second circulator pump is present.

23. The system of claim 22, further comprising:
detecting if the second circulator pump is deactivated.

24. The system of claim 13, further comprising:
providing a water bath having a cooling medium that is in thermal communication with the carbonated water; and
determining if a bath temperature of the cooling medium is below a bath set point.

\* \* \* \* \*